United States Patent Office

3,682,778
Patented Aug. 8, 1972

3,682,778
PRODUCTION OF MICROBIAL CELL-LYTIC
ENZYMES
Masanobu Kawai and Noboru Mukai, Machida-shi, Japan, assignors to Kyowa Hakko Kogyo Co., Ltd., Tokyo, Japan
Filed May 27, 1969, Ser. No. 828,316
Claims priority, application Japan, June 28, 1968, 43/44,608
Int. Cl. C07g 7/028
U.S. Cl. 195—66 R    17 Claims

ABSTRACT OF THE DISCLOSURE

Cell-lytic enzymes capable of dissolving a wide range of microorganisms, including yeasts and molds, are produced by culturing microorganisms belonging to the genus Coprinus in a suitable nutrient medium and recovering the cell-lytic enzymes from the resultant culture liquor. *Coprinus macrorhizus* var. *microsporus, Coprinus radians* and *Coprinus micaceus* are exemplified. The addition of a plant hormone to the medium serves to accelerate the production of enzyme.

---

Figure 1:
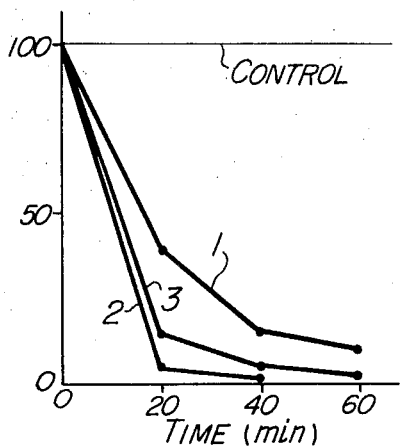

This invention relates to a process for producing cell-lytic enzymes. More particularly, it relates to a process for the production of enzymes which are capable of dissolving the cell walls of microorganisms by culturing strains belonging to the genus Coprinus in a suitable nutrient medium. Even more particularly, the invention relates to a process for producing enzymes which are capable of dissolving the cell walls of yeasts and molds by culturing Coprinus strains under appropriate conditions.

Enzymes capable of dissolving or lysing the cell walls of microorganisms are also called bacteriolytic enzymes. Egg white lysozyme is a well known example thereof. However, this enzyme only dissolves the cell walls of certain kinds of bacteria and does not work at all on the cell walls of molds and yeasts. Bacteriolytic enzymes produced from microorganisms have been reported in the prior art, for example, by the use of Streptomyces (Japanese patent publication 9,933/1958), by the use of Brevibacterium (Japanese patent publication 9,935/1963), etc. However, the bacteriolytic enzymes derived from these microorganisms almost all have the property of dissolution of Actinomycetes and bacteria, and scarcely have no effect on molds and yeasts.

Thus, the bacteriolytic enzymes known in the art have a limited scope of action and enzymes which are capable of sufficiently dissolving all of the various kinds of cell walls are unknown to the art. It has been found especially difficult to dissolve the cell walls of molds and yeasts and, even if they can be somewhat dissolved with the use of certain prior art enzymes, the effect thereof is extremely unsatisfactory. Moreover, the known enzymes have the disadvantage that when the concentration of salts in a reaction solution becomes high, for example, in a physiological salt solution, the activity of the enzymes is barely noticeable.

Accordingly, one of the objects of the present invention is to provide a process for the production of enzymes which are capable of dissolving various types of cell walls, including those of yeasts and molds, which overcomes the disadvantages and deficiencies of the prior art methods.

Another object of the present invention is to provide a process for producing cell-lytic enzymes which may be carried out in an efficacious and relatively simple manner.

A further object of the invention is to provide enzymes which are capable of dissolving the cell walls of various microorganisms, including yeasts and molds, and which have an extremely high salt resistance property.

These and other objects and advantages of the present invention will become apparent to those skilled in the art from a consideration of the following specification and claims.

In accordance with the present invention, it has been found that enzymes produced by culturing a mold belonging to the class Basidiomycetes meets the objective discussed hereinabove. The enzymes of the present invention are produced by culturing strains belonging to the genus Coprinus, for example, *Coprinus macrorhizus* var. *microsporus, Coprinus radians, Coprinus micaceus* and the like, in a solid culture medium or a liquid culture medium. Either a synthetic culture medium or a natural nutrient medium is suitable for cultivation of the strains employed in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts.

Thus, as a carbon source, there may be mentioned, by way of example, carbohydrates such as glucose, fructose, maltose, sucrose, starch, starch hydrolysate, waste molasses, dextrin, lactose, wood saccharified liquor, etc., or any other suitable carbon source such as organic acids, for example, acetic acid, lactic acid, etc. The substances may be used either singly or in mixtures of two or more.

As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, etc., or nitrates or natural substances containing nitrogen, such as cornsteep liquor, meat extract, peptone, fish meal, bouillon, casein hydrolysates, casamino acid, fish solubles, distillers solubles, soybean powder, wheat bran, etc. may be employed. Again, these substances may be used either singly or in combinations of two or more.

In addition to these various substances, materials such as yeast extract, dried yeast, rice bran, and the like are effective as an accelerator of the fermentation. The addition of plant hormones, for example, auxins such as indole-acetic acid, 2,4-dichlorophenoxyacetic acid, naphthalene acetic acid, etc., gibberellin, kinetin and the like, are even more efficacious in accelerating the fermentation.

Inorganic compounds which may be added to the culture medium include magnesium sulfate, sodium phosphate, potassium monohydrogen phosphate, potassium dihydrogen phosphate, iron sulfate, manganese chloride, calcium chloride, sodium chloride, zinc sulfate, etc.

An example of a preferred composition of the culture medium to be employed in the present invention, in the case of a solid nutrient medium, is a combination of wheat bran and rice bran. In the case of a liquid culture medium, a composition which includes sucrose, distillers solubles, dried yeast, auxins and inorganic salts is advantageously employed.

The fermentation or culturing of the microorganisms is carried out at a temperature of, for example, about 20° to 35° C. and at a pH of, for example, about 4 to 8. Culturing in a solid culture medium is usually conducted for 3–15 days. In a liquid medium, culturing is conducted under aerobic conditions, such as aerobic shaking of the culture or with stirring and aeration of a submerged culture, for from 2 to 5 days.

As a result, the enzymes of the present invention are accumulated in the resultant culture media. An enzyme solution is obtained by extracting the resulting enzyme with water or with dilute salt solutions in the case of a solid culture medium and by removing the microorganism cells from the culture liquor by filtration or centrifugal separation in the case of a liquid culture medium. The present enzyme is easily concentrated or solidified from the thus-obtained enzyme solution according to conventional enzyme-purifying methods, such as precipitation by organic solvents, salting out, concentration under reduced pressure, or adsorption or desorption by an ion exchanger. For example, a procedure involving the addition of inorganic salts such as ammonium sulfate, sodium chloride, etc. or organic solvents such as acetone, alcohol, etc. is most readily employed. The amounts of inorganic salts or organic solvents to be added varies depending upon the particular additive employed. For example, ammonium sulfate is usually added to give a final concentration of 50-65% (w./v.) and organic solvents are added to give a final concentration of 60-75% (v./v.).

The following examples are given merely as illustrative of the present invention and are not to be considered as limiting. Unless otherwise noted, the percentages therein and throughout the application are by weight per liter of water. The strain *Coprinus macrohizus* var. *microsporus* ATCC 20120; *Coprinus radians* ATCC 20014; *Coprinus micaceus* ATCC 20122 are deposited in American Type Culture Collection in Rockville, Md., U.S.A.

EXAMPLE 1

Strains:
  *Coprinus macrorhizus* var. *microsporus*—ATCC 20120
  *Coprinus radians*—ATCC 20014
  *Coprinus micaceus*—ATCC 20122

Culture medium: Percent
  Sucrose _____ 3
  Distillers solubles _____ 3
  Dried yeast _____ 1
  $KH_2PO_4$ _____ 0.5
  $MgSO_4 \cdot 7H_2O$ _____ 0.05

[pH of medium: 5.5. The medium is sterilized at 120° C. for 15 minutes].

The above strains are inoculated, respectively, into flasks containing the described culture medium. Culturing is carried out with aeration and agitation at 28° C. for 3 days. Enzyme solutions are obtained by filtering the resultant culture liquors. Ammonium sulfate is added thereto in an amount of 60% (w./v.), and the resulting solutions are sufficiently stirred and left overnight. The precipitates produced are separated by conducting a centrifugal separation at 10,000 r.p.m. continuously, and they are dialysed by the use of a cellophane tube at 0° C. overnight. The inner solutions of dialysis are filtered to remove insoluble matters therefrom. As a result, clear enzyme solutions are obtained. A dark brown crude enzyme powder is obtained by free-drying the resulting enzyme solutions.

The cell-lytic activities of the respective enzymes on an alcohol fermentation yeast, *Sacchromyces cerevisiae*, are measured in the following manner. The microorganism cells of *Saccharomyces cerevisiae* are treated with heating at 80° C. for 15 minutes and are suspended in a 0.04 M phosphate buffer solution of pH 7.3. To 4 ml. of this suspension is added 1 ml. of an enzyme solution obtained by dissolving the above-mentioned crude enzyme in said buffer solution. The decrease in relative turbidity is measured by means of a photoelectric colorimeter with the lapse of time while reacting at 37° C. The turbidity reduced by half in 60 minutes is represented as 1 unit (u.). The results are shown in Table 1 in terms of amount of crude enzyme per unit amount (mg.).

TABLE 1

| | Amount of— | | Bacteriolytic activity (u./mg.) |
|---|---|---|---|
| | Culture filtrate (ml.) | Crude enzyme (g.) | |
| *Coprinus macrorhizus* var. *microsporus* ATCC 20120 | 1,500 | 6.0 | 9.0 |
| *Coprinus radians* ATCC 20014 | 1,400 | 5.6 | 7.5 |
| *Coprinus micaceus* ATCC 20122 | 1,400 | 4.4 | 6.8 |

EXAMPLE 2

Crude enzymes are obtained by culturing the three strains described in Example 1 in culture media prepared by adding 0.05% of indole-acetic acid to the same culture medium as described in Example 1 and in accordance with the same procedure as in Example 1. The cell-lytic activities with respect to *Saccharomyces cerevisiae* are measured in the same manner as described in Example 1. The results are shown in Table 2.

TABLE 2

| | Amount of— | | Bacteriolytic activity (u./mg.) |
|---|---|---|---|
| | Culture filtrate (ml.) | Crude enzyme (g.) | |
| *Coprinus micaceus* ATCC 20122 | 1,650 | 9.0 | 12.6 |
| *Coprinus radians* ATCC 20014 | 1,500 | 11.3 | 15.2 |
| *Coprinus macrorhizus* var. *microsporus* ATCC 20120 | 1,500 | 11.8 | 19.1 |

EXAMPLE 3

Figure 2:
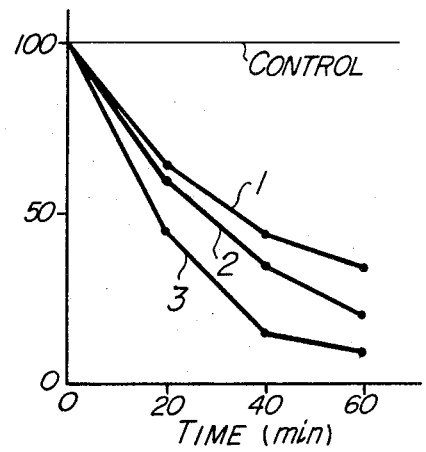
Figure 3:
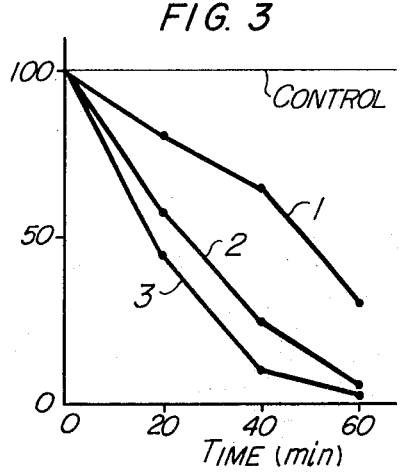
Figure 4:
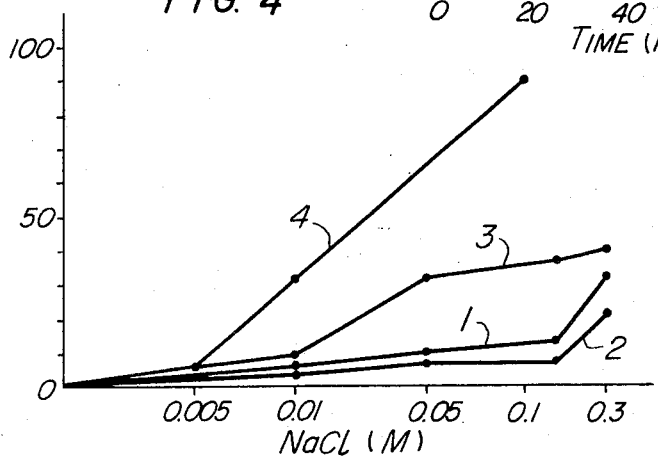

The action of the crude enzymes obtained in Example 1 with respect to the microorganism cells of *Escherichia coli* (bacterium), *Aspergillus oryzae* (mold) and *Saccharomyces cerevisiae* (yeast) is measured in the same manner as described in Example 1. The decrease in relative turbidity with lapse of time is shown in FIGS. 1, 2 and 3, respectively. In the attached drawing, line 1 represents *Coprinus micaceus*, line 2 represents *Coprinus radians* and line 3 represents *Coprinus macrorhizus* var. *microsporus*.

The respective cell bodies used as substrates are prepared in the following manner:
Bacterium: Microorganism cells of *Escherichia coli* K-12 are treated with heating at 80° C. for 15 minutes.
Mold: Microorganism cells of *Aspergillus oryzae* are disrupted by a homogenizer, washed and suspended in a M/25 phosphate buffer solution. Added thereto is a small amount of bacterial protease and toluene. The resulting suspension is left as is at 30° C. for 4 days. In this manner, the cells are removed, and the remaining cell membranes are washed.
Yeast: Microorganism cells of *Sacharomyces cerevisiae* are treated by heating at 80° C. for 15 minutes.

These experiments show that the cell membranes of microorganisms are dissolved in a short period of time by the crude enzymes produced by culturing the above-mentioned three strains with the result that the microorganism cells are broken into. As a control, a solution prepared by treating the above-mentioned respective enzymes with heating at 100° C. for ten minutes so as to destroy the activity thereof was used.

EXAMPLE 4

The action of the crude enzymes obtained in Example 1 on living cells of various bacteria and yeasts is measured in the same manner as described in Example 1 and is compared with that of an egg white lysozyme. As a result, the enzymes of the present invention show a wider range of action than egg white lysozyme and, in particular, are capable of lysing the cells of yeasts. The results are shown in Table 3.

TABLE 3

| | Egg white lysozyme | Enzymes of the present invention |
|---|---|---|
| Aerobacter aerogenes | − | − |
| Arthrobacter globiformis | + | (+) |
| Bacillus cereus | + | (+) |
| Bacillus megaterium | + | + |
| Bacillus subtilis | ++ | ++ |
| Brevibacterium ammoniagenes | − | ++ |
| Cellulomonas flavigena | − | − |
| Corynebacterium fascians | − | − |
| Micrococcus caseolyticus | − | + |

EXAMPLE 7

The same three strains as described in Example 1 are inoculated into culture media prepared by mixing 10 parts of wheat bran with 1 part of defatted rice bran, sufficiently moistening the mixture with water and sterilizing it at 120° C. for 30 minutes. A static culturing is then carried out at 30° C. for 15 days.

A culture medium in which the hypha are growing well is selected. The media are smashed finely and water is added thereto in a five-fold amount. The media are then 16. The process of claim 14, wherein the yeast is *Candida utilis*.

17. The process of claim 14 wherein the yeast cells are treated by heating at 80° C. for 15 minutes prior to the lysing treatment.

References Cited

UNITED STATES PATENTS

| | | | |
|---|---|---|---|
| 3,124,517 | 3/1964 | Eloy | 195—66 |
| 2,437,766 | 3/1948 | Stevenson et al. | 195—81 |
| 3,097,145 | 7/1963 | Shimazono et al. | 195—62 |

FOREIGN PATENTS

| | | | |
|---|---|---|---|
| 706,344 | 3/1965 | Canada | 195—2 |

OTHER REFERENCES

Clements et al.: The Genera of Fungi, Hafner Publishing Co., N.Y., 1954 (pp. 157–168).

A. LOUIS MONACELL, Primary Examiner

D. M. NAFF, Assistant Examiner

U.S. Cl. X.R.

99—96; 195—2, 62